(12) United States Patent
Venezia

(10) Patent No.: US 10,148,443 B2
(45) Date of Patent: Dec. 4, 2018

(54) AUTHENTICATION INFRASTRUCTURE FOR IP PHONES OF A PROPRIETARY TOIP SYSTEM BY AN OPEN EAP-TLS SYSTEM

(71) Applicant: THALES, Courbevoie (FR)

(72) Inventor: Elodie Venezia, Gennevilliers (FR)

(73) Assignee: THALES, Courbevoie (FR)

( * ) Notice: Subject to any disclaimer, the term of this patent is extended or adjusted under 35 U.S.C. 154(b) by 428 days.

(21) Appl. No.: 14/982,655

(22) Filed: Dec. 29, 2015

(65) Prior Publication Data

US 2016/0191254 A1    Jun. 30, 2016

(30) Foreign Application Priority Data

Dec. 31, 2014    (FR) ...................... 14 03060

(51) Int. Cl.
*H04L 9/32* (2006.01)
*H04L 29/06* (2006.01)
*H04W 12/06* (2009.01)

(52) U.S. Cl.
CPC ........ *H04L 9/3263* (2013.01); *H04L 63/0823* (2013.01); *H04L 63/0884* (2013.01); *H04L 63/0892* (2013.01); *H04L 65/10* (2013.01); *H04W 12/06* (2013.01); *H04L 2209/64* (2013.01)

(58) Field of Classification Search
CPC ............... H04L 9/3263; H04L 2209/64; H04L 63/0823; H04L 65/10; H04L 63/0892; H04L 63/0884; H04W 12/06
USPC .......................................................... 380/257
See application file for complete search history.

(56) References Cited

U.S. PATENT DOCUMENTS

| | | | | |
|---|---|---|---|---|
| 2004/0180646 | A1* | 9/2004 | Donley | H04M 1/66 455/411 |
| 2007/0250700 | A1* | 10/2007 | Sidhu | H04L 63/0823 713/150 |
| 2012/0131329 | A1* | 5/2012 | Liang | H04L 12/4625 713/151 |

OTHER PUBLICATIONS

"Documentation—IEEE802.2x Configuration management—Administration Manual", Oct. 29, 2013 (Oct. 29, 2013), pp. 1-140, Internet Archive: Wayback Machine Extrait de l'Internet: URL: web.archive.org/web/20131029220025/http:/wiki.unify.com/images/2/23/IEEE_802.1X_Configuration_Management.pdf [extrait le Nov. 18, 2015].

(Continued)

*Primary Examiner* — Kambiz Zand
*Assistant Examiner* — Aubrey H Wyszynski
(74) *Attorney, Agent, or Firm* — Troutman Sanders LLP

(57) ABSTRACT

The infrastructure according to the invention includes: a proprietary TOIP system including a call server connected to the network, integrating a certification module able to certify an IP telephone; an external certification architecture able to certify the certification module of the call server; an EAP-TLS authentication system including a RADIUS server and a directory server, the RADIUS server including a rule for verifying certificates consisting of verifying the entire certification chain formed by the certification of the IP telephone by the certification module of the call server and the certification of the certification module of the call server by the external certification architecture, the directory server including a user account for each IP telephone authorized to access the network and a match table associating a signature of the certificate of the corresponding IP telephone with each username of a user account.

5 Claims, 3 Drawing Sheets

(56) References Cited

OTHER PUBLICATIONS

French Search Report dated Nov. 18, 2015 issued in corresponding French Patent Application No. 1403060.

* cited by examiner

AUTHENTICATION INFRASTRUCTURE FOR IP PHONES OF A PROPRIETARY TOIP SYSTEM BY AN OPEN EAP-TLS SYSTEM

CROSS-REFERENCE TO RELATED APPLICATION

The present application claims priority to French Patent Application Serial No. 1403060, filed Dec. 31, 2014, the contents of which are hereby incorporated by reference in its entirety.

FIELD OF THE INVENTION

The present invention relates to telephony on an IP (Internet Protocol) or TOIP (Telephony Over Internet Protocol) network, and more particularly, securing access to an IP network by an IP telephone.

BACKGROUND OF THE INVENTION

PKI Architecture

In general, a digital certificate makes it possible to identify the holder of the certificate, i.e., the computer equipment in which the certificate is registered.

As defined by standard RFC 3280, a certificate is issued and managed by a set of hardware and software components belonging to a public key infrastructure (PKI).

A certificate includes attributes (identification of the holder, public key, validity date of the certificate, etc.), as well as a signature.

According to the asymmetrical keys technique, the public key corresponds to one and only one private key, registered on the holder's equipment.

The use of public and private cryptographic keys makes it possible, during electronic transactions, to have significant security functions, such as confidentiality, authentication, integrity and non-repudiation.

A PKI architecture includes a holder, who generates or on behalf of whom is generated, a certificate request (CSR, Certificate Signing Request), the latter including the attributes of the final certificate; a registration authority, which performs usage verifications on the values of the attributes, in particular the identity of the holder, and validates the certificate request; a certification authority, which signs the validated certificate request, so as to generate the certificate. The certificate is preferably stored by the holder.

TOIP System

A TOIP system includes IP telephones connected to an IP network, for example the local IP network of a company. Telecommunications, in particular by voice, are then conveyed through the IP network.

Advantageously, a TOIP system makes it possible to benefit from different additional services. In order to provide the services, the TOIP system includes a call server, connected to the IP network. It allows the authentication of the telephones, the transmission and reception of calls (preferably securely), call transfers, call filtering, etc. Such a call server is referred to as PABX IP or IPBX and corresponds to the evolution toward IP of a traditional PBX telephone autoswitch.

For example, the company Cisco® distributes a TOIP system including IP Cisco® telephones and a Cisco® call server, called "Cisco® Unified Communications Manager", preferably in its current version referenced 8.6.

The Cisco® call server of the Cisco® TOIP system integrates a PKI architecture, called Cisco® PKI architecture. It includes a certifying authority, called CAPF (Certificate Authority Proxy Function) certification module. The latter is able to sign certificate requests on behalf of Cisco® IP telephones. The Cisco® certificate thus created is stored on the corresponding Cisco® IP telephone.

The Cisco® TOIP system next uses these Cisco® certificates to authenticate Cisco® IP telephones. For the authentication, the TLS (Transport Layer Security) secure protocol is implemented between a Cisco® IP telephone and the Cisco® call server. The TLS protocol was standardized by a working group of the IETF (Internet Engineering Task Force). A "handshaking" procedure is thus carried out, during which the Cisco® certificates of the Cisco® IP telephone and the Cisco® call server are exchanged, verified, and a symmetrical encryption key is negotiated to secure subsequent communications.

EAP-TSL Authentication System

Furthermore, companies implement authentication procedures in order to monitor access to their local IP network by any computer equipment.

Thus, for example, the IEEE 802.1X authentication is a standard making it possible to monitor access to the local IP network based on a digital certificate.

With the IEEE 802.1X authentication, it is possible to monitor the access to each of the ports of a compatible active network equipment item. Independently of the connection type, each port acts as a switch between two states: a controlled state in case of successful authentication of the equipment connected to this port, and an uncontrolled state otherwise.

The IEEE 802.1X authentication is based on an EAP (Extensible Authentication Protocol) protocol and on an authentication server.

As defined by standard RFC 5216, EAP designates the family of protocols, within the network meaning of the term, i.e., it provides an exchange of frames in a specific format between two pieces of equipment, one working as a server, the other as a client. It includes authentication methods that are either predefined (MD5, OTP, Generic Token Card, etc.), or added. The authentication can be requested by the client or by the server.

Among the different EAP protocols, the EAP-TLS protocol is known, which is an open standard for example relative to the EAP LEAP protocol by Cisco®, which is a proprietary implementation of the EAP protocol.

The EAP-TLS protocol is an EAP protocol that encapsulates the TLS protocol.

The EAP-TLS protocol uses the certificate issued by a PKI architecture to secure the communications between the client and the server: a server-side certificate and a client-side certificate.

It should be noted that other implementations of the EAP protocol, such as the PEAP and EAP-TTLS protocols, make it possible to eliminate this client-side certificate.

According to protocol IEEE 802.1X, the application protocol between an EAP client (computer equipment) and an EAP server (port of a machine of the network to which the computer equipment is connected) is as follows:

the EAP client sends an EAP initialization message to the EAP server;

the EAP server responds by sending an EAP identity request message to the EAP client;

the EAP client sends its username in a response EAP message to the EAP server;

the EAP server sends the username to an AAA authentication server, in an access request according to a particular AAA client/server protocol, the EAP server then working as client of the AAA protocol;

the AAA application server responds to the EAP client by sending it (via the EAP server) the certificate of the AAA server;

the EAP client validates the AAA server certificate;

the EP client responds to the AAA server by sending it (via the EAP server) the certificate of the EAP client;

the AAA server validates the certificate of the EAP client;

the EAP client and the AAA server determine a WEP encryption key;

the AAA server sends the EAP server an AAA acceptance message of the connection, indicating a successful authentication, the AAA acceptance message containing the WEP key;

the EAP server sends the EAP client an EAP success message;

the EAP server sends the EAP client a public encryption key and a public encryption key length, encrypted with the WEP key.

Appendix D of the reference document for the IEEE 802.1X authentication mentions, as an example of AAA protocol and authentication server, only the RADIUS (Remote Authentication Dial-In User Service) protocol and authentication server. The RADIUS system is defined by standard RFC 2865.

Thus, although the IEEE 802.1X authentication is not explicitly connected to the RADIUS system, all known implementations of the IEEE 802.1X authentication are based on the RADIUS system. The RADIUS system has thus become a de facto standard.

It should be noted that the RADIUS client, i.e., the EAP server, is responsible for requesting the username and certificate of the equipment trying to connect to the monitored port and sends them to the RADIUS server.

The RADIUS system bases its authentication on the username of the equipment and, in the case of EAP-TLS application, the certificate of the equipment.

Among the hardware and software suppliers, the NPS (Network Policy Server) system by Microsoft®, integrating a RADIUS server, or NPS RADIUS server, is already widely deployed in companies to authenticate equipment: employees' personal computers, routers on the local network, gateways between sub-networks or toward the outside world, etc.

The NPS system includes a directory database. However, the NPS system is preferably associated with the Microsoft® Active Directory server. The latter stores the accounts of network users and a match table between usernames and the signature of the user's certificate. A signature of a certificate is calculated from the values of certain identification attributes of the user that are present in the user's certificate.

Thus, the step during which the AAA server validates the certificate of the EAP client takes place as follows, for the case of an NPS system coupled to a Active Directory server:

the NPS RADIUS server receives the username and the certificate of the EAP client. The NPS RADIUS server queries the Active Directory server to determine whether the username is associated with a user account. If it is, the NPS RADIUS server sends certain attributes of the certificate of the EAP client to the Active Directory server, which compares the values of these attributes with the imprint associated with the username in the match table. If there is a match, the Active Directory server indicates to the RADIUS server that the client can use the network. The RADIUS server continues by verifying, using appropriate rules, other attributes of the certificate: verification of the validity date, verification of the accreditation of the certifying authority having signed the certificate, etc. If the outcome of these various verifications is positive, the NPS RADIUS server validates the certificate of the EAP client. The rest of the authentication protocol can then take place.

In order to connect IP telephones to the company's local network, it is desirable to be able to authenticate this IP telephone like any other piece of equipment of the network.

The Cisco® manufacturer provides a complete infrastructure associating, in its TOIP Cisco® system, a call server and a PKI architecture.

However, this Cisco® TOIP system is proprietary. As such, this poses a security problem for companies that wish to achieve a high level of security of their facilities. Indeed, the certifying authority for Cisco® IP telephone certificates is a default authority, shared by all implantations of the Cisco® TOIP system.

Furthermore, many companies are already equipped with the Microsoft® NPS authentication system. If a company wishes to deploy IP telephones, in particular Cisco® IP telephones, it is necessary to manage an authentication system specific to Cisco® IP telephones, redundantly with authentication servers already installed for the other equipment on the network. This represents an excess cost in terms of hardware, maintenance and training of maintenance staff for such a proprietary infrastructure.

There is therefore a need to be able to authenticate an IP telephone of a proprietary TOIP system, developed by a first supplier (in particular the Cisco® TOIP system), using an open EAP-TLS authentication system, developed by a second supplier (in particular the Microsoft® NPS authentication system), while using a PKI architecture external to the TOIP system, so as to increase security on the IP network.

SUMMARY OF THE INVENTION

The invention therefore aims to resolve this problem.

The invention relates to an infrastructure for authenticating an IP telephone of a proprietary IP telephony system using an open EAP-TLS authentication system, in order to authorize said IP telephone to access an IP network, characterized in that it includes:

a proprietary IP telephony system including a call server connected to the IP network, integrating a certification module able to generate a proprietary certificate from an IP telephone;

an external certification architecture able to sign a certification request from the certification module of the call server so as to obtain a certificate for the certification module;

an EAP-TLS authentication system including a RADIUS server and a directory server, the RADIUS server including a rule for verifying certificates consisting of verifying the entire certification chain formed by the certification of said IP telephone by the certification module of the call server and the certification of the certification module of the call server by the outside certification architecture, the directory server including a user account for each IP telephone authorized to access the IP network and a match table associating the signature of the certificate of the corresponding IP telephone with each username of a user account.

According to specific amendments, the infrastructure includes one or more of the following features, considered alone or according to any technically possible combinations:

the external certification architecture is able to modify attributes of the certificate request from the certification module of the call server, before signing the modified certificate request, the obtained modified certificate being compatible both with the IP telephony system and the EAP-TLS authentication system.

the RADIUS server is able to perform dynamic matching between a proprietary username of said IP telephone, indicated in the certificate received from an IP telephone to be authenticated, and a username of the IP telephone indicated in the user account corresponding to said IP telephone in the directory server.

the IP telephony system is a Cisco® system, able to work with a Cisco® IP telephone and including a "Cisco® Unified Communications Manager" call server, preferably in version 8.6, the certification module then consisting of the "Certificate Authority Proxy Function" module of said call server.

the open EAP-TLS authentication system is a Microsoft® NPS system, integrating a NPS RADUIS server, preferably combined with an Active Directory server.

The invention also relates to a method for configuring the preceding infrastructure.

The invention also relates to a method for using the preceding infrastructure.

BRIEF DESCRIPTION OF THE DRAWINGS

The invention and its advantages will be better understood upon reading the following detailed description of one particular embodiment, provided solely as a non-limiting example, this description being done in reference to the appended drawings, in which.

DETAILED DESCRIPTION OF THE INVENTION

Structure of the Infrastructure

Figure 1:
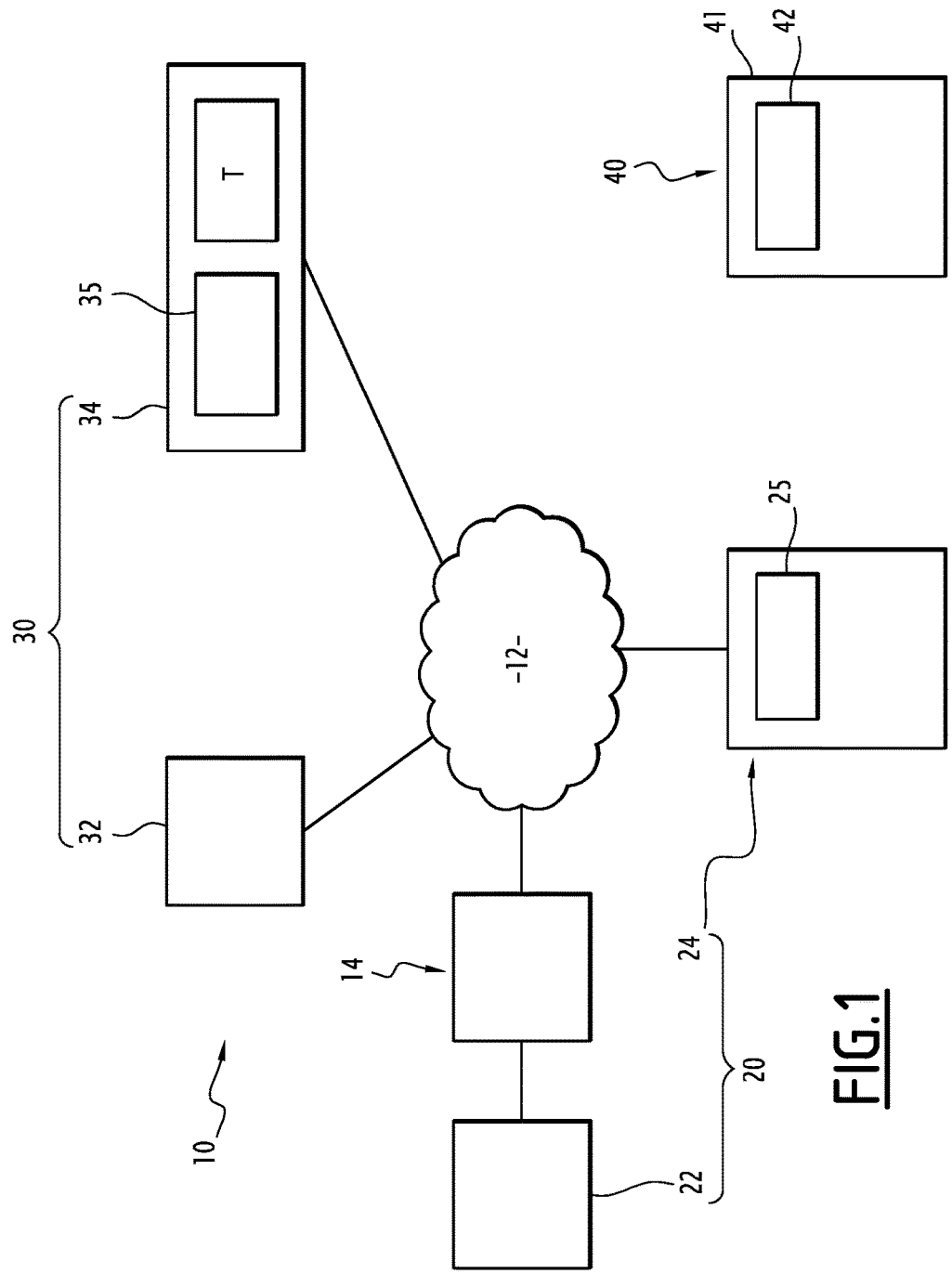
FIG. 1 is a diagrammatic illustration of one embodiment of the infrastructure according to the invention.

In reference to FIG. 1, an infrastructure 10 associating a proprietary TOIP system and an open EAP-TLS authentication system is shown.

The infrastructure 10 has, as support, an IP network 12 belonging to an organization, such as a company.

The infrastructure 10 includes a TOIP system 20, an EAP-TLS authentication system 30 and a PKI architecture 40.

The TOIP system 20 is a proprietary system. It is in particular a CICSO® TOIP system.

It includes a plurality of IP telephones 22, only one of which is shown in FIG. 1.

The IP telephone 22 is connected to the local IP network by an access point 14.

The TOIP system 20 also includes a call server 24, connected to the IP network 12.

The call server 24 of the Cisco® TOIP system includes a module, called CAPF (Certificate Authority Proxy Function) module, referenced 25 in FIG. 1. The CAPF module 25 constitutes of a PKI architecture for the Cisco® TOIP system 20, able to generate Cisco® certificates for IP telephones 22.

A certificate request for an IP telephone 22 can only be generated by the CAPF module 25, such that the values of the attributes contained in the certificate request and consequently in the final certificate allow the operation of the telephone 22 with the call server 24. The models for Cisco® certificate requests cannot be modified. They are imposed by Cisco®. These models may optionally be different depending on the version of the IP telephone 22 to be certified.

A certificate request can only be signed by the certification authority for the CAPF module 25.

The EAP-TLS authentication system 30 is an open system. It in particular involves the NPS system by Microsoft®.

Its purpose is to implement, for each IP telephone 22, an authentication according to standard IEEE 802.1x EAP-TLS when this IP telephone connects to a control port of an access point 14.

The EAP-TLS authentication system 30 includes a RADIUS server 32, in particular the NPS RADIUS server by Microsoft®, connected to the IP network 12.

The EAP-TLS authentication system 30 includes a directory server 34, in particular the Active Directory server by Microsoft®.

The directory server includes, for each user authorized to access the IP network 12, a user account 35, in particular including a username, and a match table T associating each username of an account with a signature of a certificate for that user.

The external PKI architecture 40 is shown diagrammatically by the server 41 in FIG. 1. The server 41 may be on or off the IP network 12, optionally with no direct communication link with the IP network 12. For example, the external PKI architecture 40 is the solution provided by the company Thales.

The external PKI architecture 40 includes a certification authority 42 for the certificate requests it receives. This certification authority.

Configuration of the Infrastructure

Figure 2:
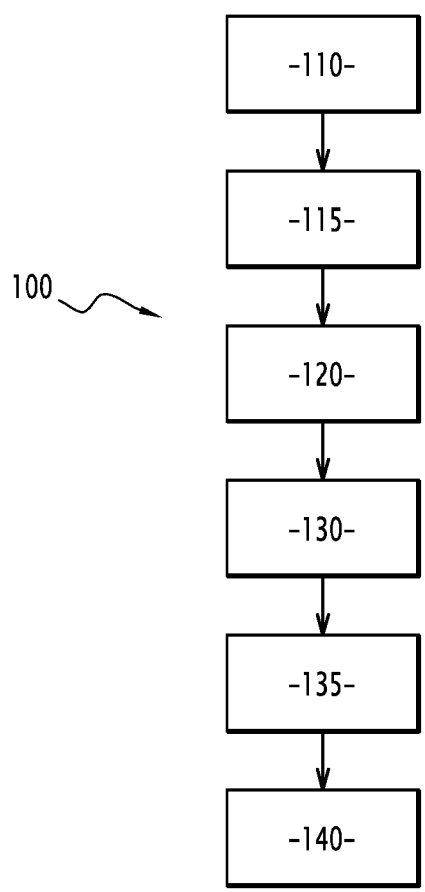
FIG. 2 is a diagrammatic illustration of the steps of a method for configuring the infrastructure of FIG. 1.
Figure 3:
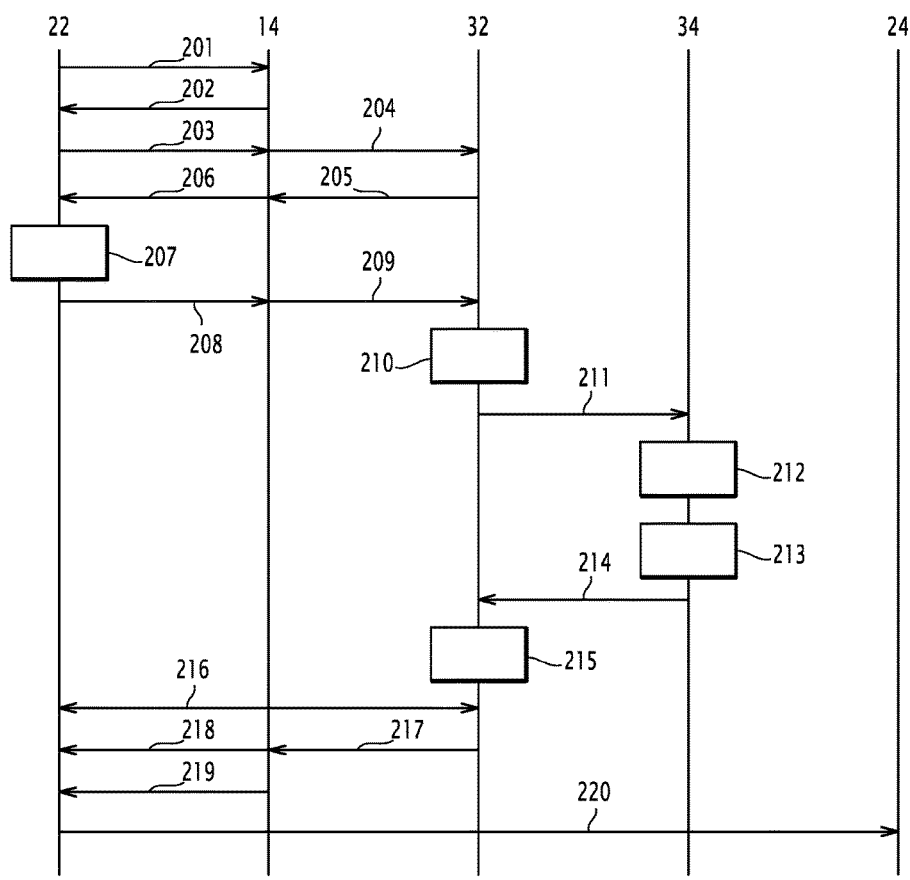
FIG. 3 is a diagrammatic illustration of the steps of a method for using the infrastructure of FIG. 1.

The method 100 for configuring the infrastructure described above is illustrated in the diagram in FIG. 2.

In step 110, in order to increase the access security of the IP network 12, using the PKI architecture 40, a certificate request is generated for the CAPF module 25 of the call server 24, then signed by the certification authority 42 of the external PKI architecture 40, so as to obtain a certificate for the CAPF module 25.

The certificate request for the CAPF module 25 of the call server 24 is generated by the CAPF module 25 itself.

In order for the certificate for the CAPF module 25 to be able to be used both by the Cisco® TOIP system 20 and the Microsoft® NPS authentication system 35, it is necessary to modify the certificate request generated for the CAPF module 25. Indeed, some values of the attributes present in the certificate request generated for the CAPF module 25, and by the CAPF module 25, are incorrectly interpreted by the Cisco® system and/or the Microsoft® system.

To that end, a script is integrated in the external PKI architecture so as to generate, from the certificate request for the CAPF module 25, a modified certificate request for the CAPF module 25. This script makes it possible to select values compatible with the requirements of the Cisco® and NPS systems for the attributes of the certificate request for the CAPF module 25. Once signed by the PKI architecture 40, a modified certificate for the CAPF module 25 is issued and injected on the call server 24.

The certificate for the CAPF module 25 in particular make it possible to create a certification chain: a Cisco® IP telephone is certified by a Cisco® certificate generated by the CAPF module 25, and the CAPF module 25 is certified by a certificate generated by an external PKI architecture.

In step 115, the configuration includes generating a Cisco® certificate request for each IP telephone 22 by using the CAPF module 25. The latter signs the Cisco® certificate request so as to obtain a Cisco® certificate that is stored on the corresponding IP telephone. A Cisco® certificate in particular includes a username included on at least 19 characters, i.e., a long username LUserName.

In step 120, the configuration method continues by creating rules in the NPS RADIUS server.

First rules, called network strategy rules, make it possible to perform verifications of a set of conditions, constraints and parameters seeking to authorize an IP telephone to connect to the network and define the circumstances under which this IP telephone can connect.

In particular, the NPS RADIUS server is configured so as to modify a first rule relative to the verification of the certification authority having granted the Cisco® certificate for the IP telephone 22. This rule makes it possible to extract, from the Cisco® certificate of the IP telephone 22, the name of the authentication authority, i.e., of the CAPF module 25; then to verify the certificate of the CAPF module 25, i.e., the certificate issued by the PKI architecture 40. The verification rule for the certification authority makes it possible to verify the certification chain.

Other first rules are configured on the NPS RADIUS server to verify the validity date of the Cisco® certificate, the functionalities associated with the Cisco® certificate, etc., or to verify the existence of a user account (by querying the directory server), or the fact that the IP telephone actually connects in the EAP-TLS, etc.

The configuration includes step 130 for creating, on the Active Directory server 34, a user account for each IP telephone to be authenticated. This involves associating a username SUserName with each IP telephone.

The username SUserName in the Microsoft® Active Directory server 34 is limited to 15 characters. An IP telephone is therefore identified therein by a short username.

However, according to the model of the Cisco® certificates, the username of the IP telephone 22 can only be a long username LUserName.

The NPS RADIUS server must therefore be able, from the long username of the Cisco® certificate received from an IP telephone 22 seeking to be authenticated, to create a query request from the directory server 34 using the short username.

To that end, in step 135, the RADIUS server is configured by creating second rules, called connection request strategy rules, which define conditions and parameters making it possible to designate the server that must perform a task, associated with the message sent by a particular IP telephone 22, such as the authentication of that IP telephone.

In particular, the NPS RADIUS server is configured so as to create a second rule able to dynamically convert the long username LUserName into a short username SUserName. For example, the short name corresponds to the first 15 characters of the long name, such that the dynamic transformation done by the RADIUS server is an operation truncating the long name present in the received certificate.

In step 140, it is lastly necessary to create, in the Active Directory server 34, a match table making it possible to connect the short username SUserName with a signature of the Cisco® certificate, such that the directory server can respond to a request from the NPS RADIUS server 32 to verify the identity of the Cisco® certificate.

This step therefore includes creating a signature for each certified IP telephone 22 and creating the short username/signature of the Cisco® certificate match table.

The configuration steps described above can be done in a different order.

Operation of the Infrastructure

The authentication method, according to standard IEEE 802.1x, is then as follows once the IP telephone 22 is connected to a port of the access point 14:

in step 201, the IP telephone 22, as EAP client, sends an EAP initialization message to the access point 14, as EAP server;

in step 202, the access point 14 responds by sending an identity request EAP message to the IP telephone 22;

in step 203, the IP telephone 22 sends its username LUserName in a response EAP message to the access point 14;

in step 204, the access point 14 sends its username LUserName to the NPS RADIUS server 32, in an access request according to a particular client/server AAA protocol, the access point 14 then operating as client of the AAA protocol;

in step 205, the NPS RADIUS server 32 responds to the access point 14 by sending it its certificate of the NPS RADIUS server (for example, created by the external PKI architecture 40);

in step 206, the access point 14 sends the certificate for the NPS RADIUS server to the IP telephone 22;

in step 208, the IP telephone 22 responds by sending its Cisco® certificate to the in step 207, the IP telephone 22 validates the NPS RADIUS server certificate; access point 14;

in step 209, the access point 14 sends the Cisco® certificate to the NPS RADIUS server;

in step 210, the NPS RADIUS server reads the username LUserName in the Cisco® certificate and dynamically truncates the username LUserName to obtain the short username SUserName;

in step 211, the NPS RADIUS server sends the short name SUserName and the Cisco® certificate to the Active Directory server 34;

in step 212, the directory server 34 verifies that a user account corresponds to the short username SUserName;

if yes, in step 213, the directory server 34 extracts the certificate signature associated with the short username SUserName from the table T, produces a signature of the Cisco® certificate received from the NPS RADIUS server, and compares it to the certificate signature extracted from the table T;

if there is a match, in step 214, the directory server 34 sends the NPS RADIUS server an identification confirmation for the IP telephone 22;

in step 215, the NPS RADIUS server then continues the verification of the Cisco® certificate in particular by applying the verification rule of the certification chain to it;

then, if the NPS RADIUS server validates the Cisco® certificate of the IP telephone 22, in step 216, a WEP encryption key is negotiated between the NPS RADIUS server and the IP telephone 22 via the access point 14;

in step 217, the NPS RADIUS server sends the access point 14 an AAA acceptance message of the connection, indicating a successful authentication, the AAA acceptance message containing the WEP key;

in step 218, the access point 14 sends the IP telephone an EAP success message;

in step 219, the access point 14 sends the IP telephone 22 a public encryption key and a public encryption key length, encrypted with the WEP key.

The IP telephone 22 can thus access the IP network 12, and in particular connect (step 220) to the Cisco® call server 24 by establishing a secure TLS connection with the latter, the modified Cisco® certificate of the IP telephone 22 again being used during this step.

It is thus possible, using the Microsoft® NPS system, to authenticate the Cisco® IP telephones, with a same certificate that is compatible between the Cisco® TOIP component and the Microsoft® authentication component.

This solution makes it possible to increase security by using a certification authority other than the default authority of the Cisco® TOIP system.

This solution therefore allows independence with respect to the Cisco® tools, both for the Cisco® certification tools and the Cisco® authentication tools.

In this solution, the authentication of all of the equipment of the company, IP telephones and computers, is centralized on the same Microsoft® server or set of servers.

It is possible to use the Microsoft® TOIP system in combination with the Cisco® TOIP system. Indeed, the latter works naturally with the Microsoft® NPS authentication system. The network is thus secured by using a single type of authentication system.

If there is a Microsoft® authentication system already in place, this solution makes it possible not to modify the authentication system when Cisco® IP telephones are deployed. Without the solution, it would not be possible to secure access to the network by the Cisco® IP telephones. It would be necessary to establish the Cisco® RADIUS ISE server in place of the Microsoft® RADUIS NPS server, and consequently, to change the infrastructure as a whole.

Theoretically, according to the Cisco® documentation, the Cisco® TOIP system supports the use of certificates signed by an external certification authority.

Furthermore, no contraindication is mentioned regarding the possibility of using the Cisco® certificates in an EAP-TLS authentication system, in particular the Microsoft® NPS system.

However, during tests, compatibility limitations have been observed during analysis by the EAP-TLS authentication system of the Cisco® certificates.

Thus, IEEE 802.1X authentication of the Cisco® IP telephones with a Cisco® certificate is not possible in the Microsoft® NPS authentication system.

The invention claimed is:

1. An infrastructure for authenticating an IP telephone of a proprietary IP telephony system by means of an open EAP-TLS authentication system, in order to authorize said IP telephone to access an IP network, wherein said infrastructure includes:

the proprietary IP telephony system including a call server connected to the IP network, integrating a certification module for generating an authenticating proprietary certificate for an IP telephone;

an external certification architecture for signing a certification request from the certification module of the call server so as to obtain a certificate for the certification module;

the EAP-TLS authentication system including a RADIUS server and a directory server, the RADIUS server including a rule for verifying certificates consisting of verifying the entire certification chain formed by the certification of said IP telephone by the certification module of the call server and the certification of the certification module of the call server by the external certification architecture, the directory server including a user account for each IP telephone authorized to access the IP network and a match table associating a signature of the certificate of the corresponding IP telephone with each username of the user account.

2. The infrastructure according to claim 1, wherein the external certification architecture modifies attributes of the certificate request from the certification module of the call server, before signing the modified certificate request, the modified certificate obtained being compatible both with the proprietary IP telephony system and the EAP-TLS authentication system.

3. The infrastructure according to claim 1, wherein the RADIUS server performs a dynamic matching between a proprietary username of an IP telephone, indicated in the certificate received from an IP telephone to be authenticated, and a username of the IP telephone indicated in the user account corresponding to said IP telephone in the directory server.

4. The infrastructure according to claim 1, wherein the open EAP-TLS authentication system is a Network Policy Server (NPS) system, integrating a NPS RADIUS server.

5. The infrastructure according to claim 4, wherein the NPS system is combined with an Active Directory server.

* * * * *